May 20, 1930.  J. F. WALLACE  1,759,674
SHOCK ABSORBER FOR LANDING GEARS FOR AEROPLANES
Filed April 8, 1926   2 Sheets-Sheet 1
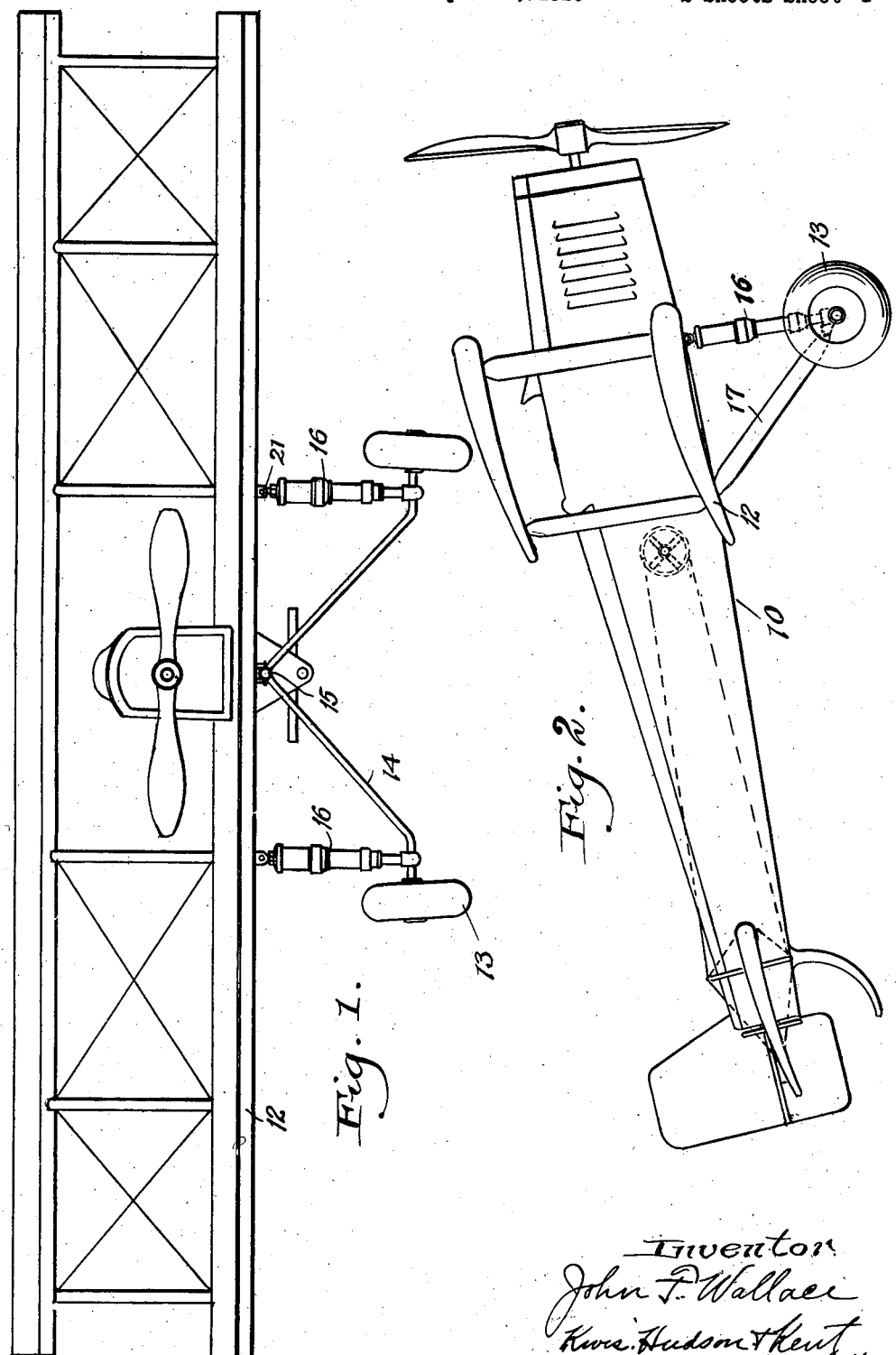

May 20, 1930.  J. F. WALLACE  1,759,674
SHOCK ABSORBER FOR LANDING GEARS FOR AEROPLANES
Filed April 8, 1926  2 Sheets-Sheet 2

Inventor
John F. Wallace
Kwis. Hudson & Kent
Attys.

UNITED STATES PATENT OFFICE

JOHN F. WALLACE, OF SHAKER HEIGHTS, OHIO, ASSIGNOR TO THE CLEVELAND PNEUMATIC TOOL COMPANY, OF CLEVELAND, OHIO, A CORPORATION OF OHIO

SHOCK ABSORBER FOR LANDING GEARS FOR AEROPLANES

Application filed April 8, 1926. Serial No. 100,521.

This invention relates to a shock absorber adapted particularly for an aeroplane landing gear and has for its chief object to provide a shock absorbing member preferably in the form of a strut which will absorb the shock which would otherwise be transmitted to the aeroplane itself when the plane makes a landing on ground, water or deck of a ship.

A further object is to provide a shock absorbing element in the landing gear so formed as to absorb the shock, prevent sudden rebound and at the same time enable the absorption of shocks should the plane strike repeatedly or in quick succession on landing or should the plane immediately on striking the ground or deck of a ship ride over an obstruction.

The shock absorbing device formed in accordance with my invention is arranged between the part which engages the ground, water or deck and the body of the plane and is composed of telescopic members arranged in the landing gear in a manner such as to avoid being subjected to lateral stresses when landing occurs and which are so formed as to yieldingly resist the thrust on landing preferably by the simultaneous action of compressed air and vacuum set up in certain chambers of the device and to prevent sudden rebound preferably by the action of oil or other suitable liquid contained in the device, the same serving to cause a relatively slow return to normal position.

The invention may be briefly summarized as consisting of certain novel combinations and arrangements of parts and details of construction which will be described in the specification and claims.

Figure 3:
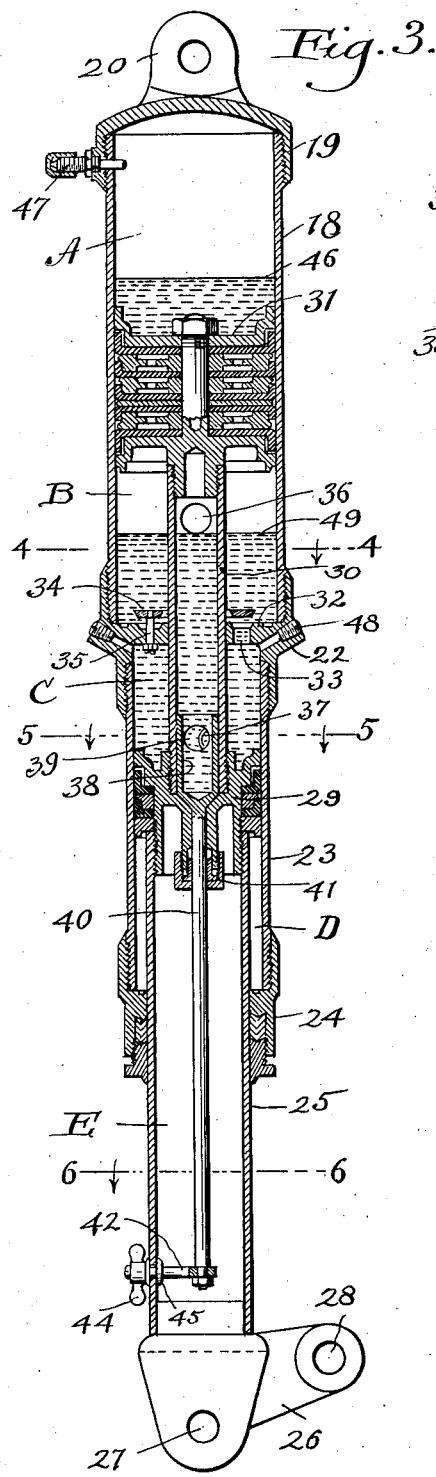
Figure 4:
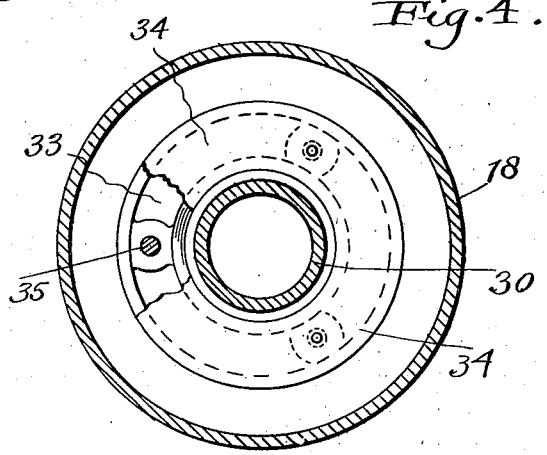
Figure 5:
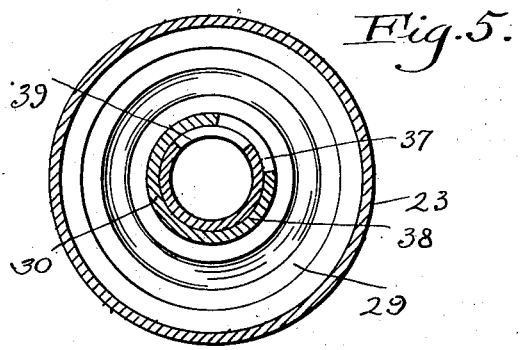
Figure 6:
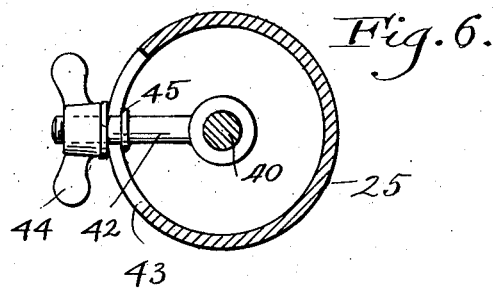

My invention is equally applicable to aeroplanes and seaplanes, for the invention has utility in absorbing shocks due to landing on the ground or other more or less solid landing spots, such as deck of a ship, or on the water, but for convenience I have illustrated the invention applied to an aeroplane; Fig. 1 being a front view of the same; Fig. 2 a side view; Fig. 3 a vertical sectional view of the strut on a larger scale than in Figs. 1 and 2; Figs. 4, 5 and 6 being cross-sectional views on a still larger scale substantially along the lines 4—4, 5—5 and 6—6, respectively of Fig. 3.

In the drawings 10 represents the fuselage and 12 the wings of the plane which has a langing gear including, in this instance, ground or deck engaging wheels 13 on the outer ends of axles or rods 14, the inner ends of which are connected at 15 to the lower side of the fuselage, this connection being preferably a universal one. From the connection point 15 the axles extend downwardly and outwardly, the outer portions being substantially horizontal. The outer portions of each axle are connected to the lower wing, in this instance by two struts 16 and 17, the former being a shock absorbing telescopic strut and the latter being rigid. When the plane lands the wheels and outer portions of the axle swing upwardly but the rigid struts 17 require them also to swing forwardly, so that there is a composite motion imparted to the axles 14 necessitating a universal connection 15 between the inner ends of the axles and the fuselage and universal connections or the equivalent of universal connections between the telescopic and rigid struts 16 and 17 and the parts to which they are connected. This permits free movement of the parts and relieves the telescopic strut 16 of lateral stresses which, if existing, would prevent free sliding movement between the telescopic parts.

Taking up now the construction of the telescopic strut, it will be seen by reference to Figs. 3 to 5 that it includes an upper cylindrical member 18 provided at the top with a cap 19 having a lug 20 designed to have a universal connection, indicated at 21, with the lower wing of the plane.

The lower part of the cylindrical member 18 is connected by a screw coupling 22 to a second cylindrical member 23 which is smaller in diameter than the upper cylindrical member 18. The cylindrical members 18 and 23 are rigidly connected and in effect constitute one cylindrical element of different diameters.

At the lower part of the cylindrical member 23 is a stuffing box 24 including suitable packing and a gland, and slidable through it is a third cylindrical member or sleeve 25 at the bottom of which is secured a fitting 26 having an eye or opening 27 to accommodate the outer portion of the associated axle or rod 14 and having another eye or opening 28 to which the lower end of the rigid strut is adapted to be pivotally connected.

At the top of the lower sleeve or cylindrical member 25 is a piston 29 which slidingly engages the inner wall of the second cylindrical member 23. This piston, which in this instance for convenience of manufacture and assembly is detachably connected to the lower cylindrical member 25, may and preferably does consist of several parts or sections clamped together and provided with intervening packing elements, which in this case have upturned margins and may consist of leather or other suitable material.

Rigidly attached to the top of the piston 29 and extending upwardly therefrom into the upper cylindrical member 18 is a centrally disposed tube 30 and to the upper end of this tube is attached a piston 31 slidingly engaging the inner wall of the upper cylindrical member 18. This piston 31, like piston 29, is preferably composed of a plurality of sections clamped together and is provided with a series of spaced packing elements formed of suitable material, such as leather, and preferably the margins of some of the packing elements are upturned and others are downturned so as to form a seal against leakage in either direction past the piston.

The connections between the tube and the two pistons 29 and 31 may be formed in different ways but, in this instance, the lower end of the tube is screwed into a threaded flange or socket of the lower piston 29 and its upper end is screwed onto a boss on the lower side of the upper piston 31.

The coupling 22 connecting the cylindrical members 18 and 23 is provided with a transverse partition 32 having a central opening through which the tube 30 freely extends. Additionally, the partition 32 is provided with a valve which will allow the flow of oil or other fluid through the partition in one direction only. In this instance, the valve is composed of a plurality of arc-shaped ports 33 adapted to be closed by a movable valve member in the form of an annulus 34 which has a seat formed on the upper side of the partition and is capable of a vertical movement off the seat limited in this instance by guide pins 35.

Liquid is adapted to pass through the valve from the lower side to the upper side of the partition 32 when the cylindrical members are telescoped inwardly, but when they are extended or given a sliding movement in the opposite direction the liquid is returned from the upper side to the lower side of the partition 32 through the tube 30, and for this purpose the tube is provided near its upper end with an opening or port 36 and near its lower end with a similar opening or port 37.

The fluid is returned through the tube during the rebound stroke more slowly than it passes upwardly through the ports 33 on the compression or shock absorbing stroke so that the rebound may be effectively checked. It is desirable that the rate of return movement following the collapsing due to the impact on landing be made adjustable and, accordingly, the rate of flow of the fluid through the tube is, by my invention, made adjustable from the exterior of the device. In this instance this is accomplished by means which admits of the adjustment of the effective size of the lower port 37 of the tube, said means consisting of a rotary thimble 38 seated in the lower part of the tube 30 and in the central part of the piston 29, this thimble having an opening or port 39 adapted to be brought into full or partial register with the lower opening or port 37 of the tube. The lower part of the thimble has a rod-like extension 40 extending through a stuffing box 41 provided on the lower central part of piston 29 and this rod extends down through the cylindrical member 25 to near its lower end. Means is provided for turning or adjusting rod 40 and thimble 39 and in this instance this consists of an adjusting lever or finger 42 which is attached to the lower end of rod 40 and extends laterally therefrom out through an arc-shaped slot 43 formed in the wall of the lower cylindrical member 25. The lever 42 is adapted to be held immovable in any given position by a clamp composed of a thumb nut screwed on the outer end of the lever and a shoulder 45 formed on the lever and engaging the inner wall of the cylindrical member 25. When the thumb nut is loosened the lever 42 can be swung laterally so as to turn the rod 40 and the thimble 39 at its upper end, thus adjusting the effective size of the lower opening 37 formed in tube 30.

It will be seen from the above that the cylinders 18 and 23 by reason of the fact that they are joined by the flange coupling 22 constitute one rigid member and that the lower cylindrical member 25 with its piston 29, the tube 30 and the upper piston 31 in effect constitute a second rigid member slidable in or telescopically disposed with respect to the first named rigid member.

This construction forms an upper chamber "A" between the piston 31 and the head or upper end of the cylindrical member 18, also a chamber "B" between the piston 31 and the partition 32 carrying the valve 34, also a third chamber "C" between the partition 32 and the lower piston 29, also a chamber "D" between the concentric walls of the cylindrical members 23 and 25. These chambers are all of variable volumetric capacity or size as the telescopic action takes place; additionally, of course, there is a chamber in the lower cylindrical member between the piston 29 and the fitting 26 but the capacity of this chamber is unchanged and it does not function in the normal use of the device.

The operation of the device is as follows:

Let it be assumed that the telescopic or shock absorbing strut is properly arranged with the other parts of the landing gear on the plane, and let it be assumed that the weight of the plane is resting on the wheels prior to the application of the compressed air and oil which are employed for the proper operation of the device. In this condition the parts of the telescopic strut will be collapsed to the maximum extent, the cylindrical member 25 being now well up in cylindrical member 23 and the pistons 31 and 29 being more or less close to the upper ends of the chambers "A" and "C". A quantity of oil is first supplied to chamber "A", the same being indicated by the reference character 46, so as to, at all times, cover the piston 31 and form a seal, and sufficient compressed air is admitted to the chamber "A" to force the piston 31 downward to the extreme lower end of the cylindrical member 18, the piston coming to rest on the partition 32 of the flange coupling 22. The oil and compressed air can be admitted to chamber "A" through a suitable valve connection 47 shown in Fig. 3. With the piston 29 now well down in the cylindrical member 23 a quantity of oil is admitted to chamber "C" through one or more normally closed inlets, indicated at 48, in this instance extending through coupling 22. This oil is indicated in Fig. 3 by reference character 49. The pressure in chamber A is now relieved somewhat by manipulation of the valve connection 47, in order to bring the parts into the relation substantially as shown in Fig. 3. The device is now ready for action.

As explained above, with the device subjected to the weight of the plane, the telescopic members are partially extended, as indicated in Fig. 3, by air pressure supplied to chamber "A". When the impact occurs on landing the parts are telescoped, the pistons 29 and 31 traveling upwardly in the cylindrical members 23 and 18, respectively. When this occurs the oil in chamber "C" passes freely through the valve ports 33 into chamber "B" but the cross-sectional area of chamber "B" is larger than that of chamber "C" and, consequently, the oil will not travel upward in chamber "B" as rapidly as the piston 31 moves upwardly. Consequently, not only is the air in chamber "A" compressed but a vacuum is produced in chamber "B" between the bottom of piston 31 and the top of the body of oil forced up in chamber "B". Consequently the telescopic action occurring on impact is opposed by the compression of the air in chamber "A", by the vacuum produced beneath piston 31 and by the vacuum produced in the annular chamber "D". When the parts come to rest immediately following the compression stroke the increased air pressure in chamber "A" and the vacuum produced in chamber "B" in addition to that which may occur in chamber "D" tend to return the parts to normal position but after the vacuum beneath the piston 31 is relieved by a certain downward movement of the piston, the further movement of the parts to normal position is checked by the flow of oil from chamber "B" to chamber "C" through tube 30.

The fact that a vacuum is produced above the oil level in chamber "B" is an important feature of the invention, for not only does the vacuum produced in this chamber resist the compression stroke or impact but it is useful in preventing serious shock to the plane if a series of impacts occur in rapid succession as may occur if the wheels ride off the ground after the first impact or if they should meet an obstruction immediately upon engaging the ground or deck. By way of explanation of this feature or advantage it might be stated that if chamber "B" is solidly filled with oil at the end of the compression stroke and if the return of the parts to or toward normal position were dependent solely upon the restricted rate of flow of oil back to the lower chamber "C", there could be no material yielding of the shock absorber due to an impact occurring quickly after the first impact. However, by reason of the fact that the chamber "B" is larger than chamber "C" and by reason of the fact that there is a vacuum between the oil level and bottom of the piston 31 at the end of the compression stroke, the piston 31 is free to move downward a certain amount immediately after the first impact and in consequence, the piston can move upward or yield a certain amount with the occurrence of each additional impact to the extent, or at least to part of the extent, that the piston moves downward in relieving the vacuum; that is to say, immediately following each impact the piston moves downward so as to relieve the vacuum beneath it without the necessity of replacing any oil and is thus immediately placed in condition to meet and check a succeeding impact. This quick return in relieving the vacuum in chamber "B" does not have any detrimental effect, the main return stroke occurring relatively slowly due to the governed rate of return of oil from chamber "B" to chamber "C".

Just before the upper piston reaches the partition 32 at the close of the return stroke the upper opening 36 in tube 30 passes beneath the partition gradually checking the flow of oil into and through the tube until finally the opening 36 is closed entirely, in which event the piston will seat easily and quietly onto the oil.

Thus it will be seen that I have provided a shock absorbing element or strut, of what may be termed the pneumatic-hydraulic type, and composed of relatively movable parts and having an air chamber for cushioning the stroke on impact and a chamber for controlling the recoil at a rate dependent upon the restricted flow of oil and other fluid, together with means whereby the early part of the recoil movement is free and not affected by the restricted fluid flow.

While I have shown the preferred construction wherein the measured or restricted return of fluid takes place through the stem connecting the pistons, I do not desire to be confined to this construction for the restricted fluid return may take place through other means.

I have illustrated and described the invention as applied to aeroplanes for landing on the ground or deck of a ship but, as previously stated, the invention has utility in the landing gear for planes adapted to land on the water in which event the wheels will be replaced by pontoons or equivalent devices.

Having thus described my invention, I claim:

1. A shock absorbing device, comprising a pair of telescopic members, one in the form of a cylinder and the other slidable therein and having two pistons engaging the inner wall of the cylinder, there being a cushioning chamber between the head of the cylinder and one piston, and a fluid receiving recoil checking space between the pistons, embodying means for retarding the flow of fluid therein in one direction.

2. A shock absorbing device, comprising a cylinder having portions of two different diameters and members slidable therein and having pistons engaging the inner walls of the portions of the cylinder of different diameters, there being a cushioning chamber between the head of the cylinder and one of the pistons, and a fluid receiving recoil checking space between the pistons, embodying means for retarding the flow of fluid therein in one direction.

3. A shock absorbing device, comprising a cylinder, a member slidable therein and having two pistons engaging the inner wall thereof, there being a fluid containing space between the pistons, the parts being so formed that upon the compression or collapsing stroke the volumetric capacity of said space is increased.

4. A shock absorbing device, comprising a cylinder, a wall dividing the cylinder and having a one-way valve, a member slidable in the cylinder and having two pistons one on each side of said wall.

5. A shock absorbing device, comprising a cylinder having portions of different diameters separated by a wall having a one-way valve therein, a member slidable in the cylinder and having pistons on opposite sides of said wall and having a stem connecting the pistons and passing through the wall.

6. A shock absorbing device, comprising a cylinder having portions of different diameters separated by a wall having a valve opening, a member slidable in the cylinder and having pistons on opposite sides of said wall and having a stem connecting the pistons and passing through the wall, a fluid between the pistons and adapted to be transferred from one side of the wall to the other from the portion of smaller diameter to the portion of larger diameter on the compression or telescopic stroke.

7. A shock absorbing device comprising a cylinder divided by a transverse wall having a one-way valve, a member slidable therein and having two pistons and a stem connecting them and passing through the wall, a fluid in the cylinder between the pistons, said valve permitting the transfer of fluid from one side of the wall to the other on the compression or collapsing stroke.

8. A shock absorbing device comprising a cylinder divided by a transverse wall having a one-way valve, a member slidable therein and having two pistons and a stem connecting them and passing through the wall, a fluid in the cylinder between the pistons, said valve permitting the transfer of fluid from one side of the wall to the other on the compression or collapsing stroke, and means permitting a relatively slow return of the fluid during the rebound stroke.

9. A shock absorber comprising a cylinder having a dividing wall with a one-way valve, a member slidable therein and having two pistons engaging the cylinder on opposite sides of said wall, a hollow stem connecting the piston and having ports or openings for the return of fluid independently of the valve.

10. A shock absorbing device, comprising a cylinder having portions of different diameters and provided with a transverse partition having a valve, a member slidable in the cylinder and having two pistons engaging the cylinder on opposite sides of the partition, said valve permitting the transfer of fluid from the portion of the cylinder of relatively small diameter to the portion of larger diameter on the compression stroke, a hollow stem connecting the pistons and having means for the return of fluid to the portion of the cylinder of relatively small diameter independently of the valve.

11. A shock absorber, comprising a cylinder having a transverse partition containing a valve, a member slidable in the cylinder and having pistons engaging the cylinder on opposite sides of the partition, a hollow stem connecting the pistons and having openings for the return of displaced fluid and means for adjusting the rate of flow therethrough.

12. A shock absorber comprising a cylinder having a dividing partition provided with a valve, a member slidable in the cylinder and composed of pistons engaging the cylinder on opposite sides of the partition, a liquid between the pistons and adapted to be transferred from one side of the partition to the other on the compression or collapsing stroke, a stem connecting the pistons and having openings for the return of liquid during the rebound stroke, and means accessible from the exterior of the device for adjusting the rate of flow through the stem.

13. A shock absorbing element composed of relatively slidable members having a cushioning chamber and a fluid containing portion with means for permitting recoil at a rate determined by a restricted flow of fluid, and means whereby the first portion only of the recoil movement is relatively free and independent of the fluid flow.

14. A shock absorbing strut composed of relatively movable parts provided with a cushioning chamber and a compartment containing a liquid, together with means whereby on the cushioning stroke the liquid is transferred relatively freely from one part of the compartment to another and on the return stroke relatively slowly, the cushioning stroke being resisted by compression in said chamber and by vacuum created in said compartment.

In testimony whereof, I hereunto affix my signature.

JOHN F. WALLACE.